Dec. 28, 1954  G. M. BENNER  2,698,091
CENTRIJUICER

Filed Oct. 5, 1950  3 Sheets-Sheet 1

INVENTOR.
George M. Benner,
BY Victor J. Evans & Co.
ATTORNEYS

Dec. 28, 1954  G. M. BENNER  2,698,091
CENTRIJUICER
Filed Oct. 5, 1950  3 Sheets-Sheet 2
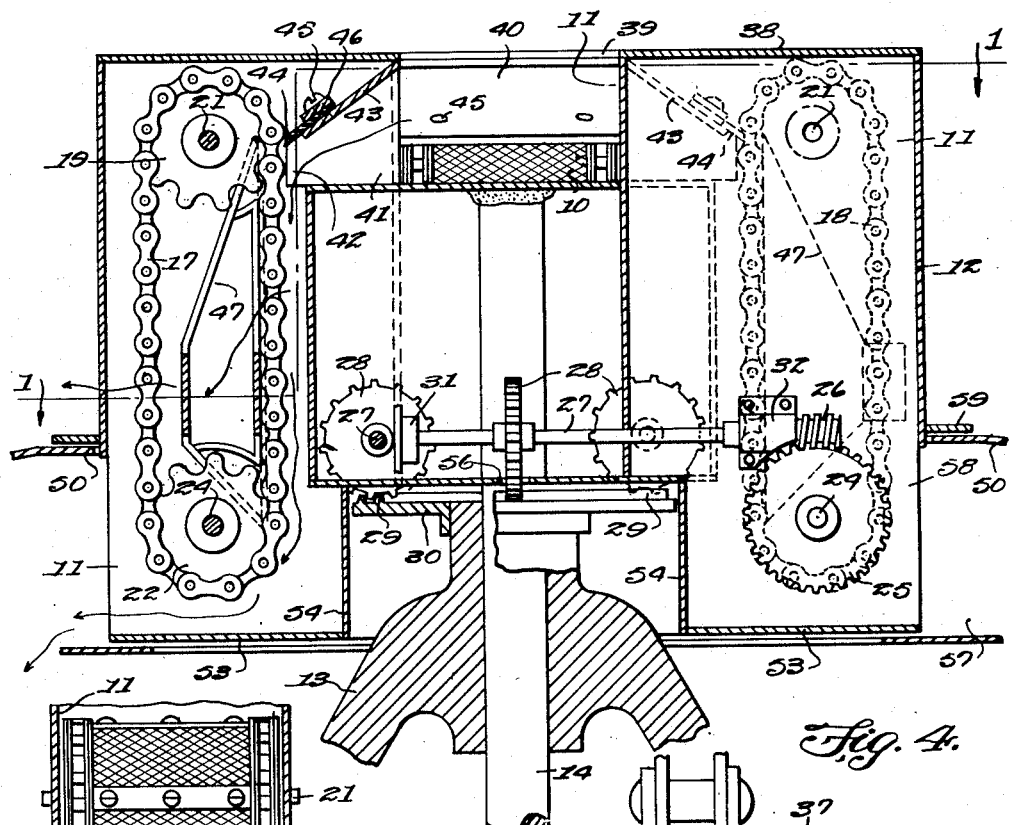
Fig. 2.
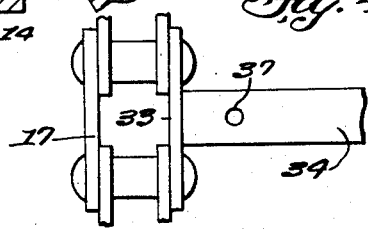
Fig. 4.
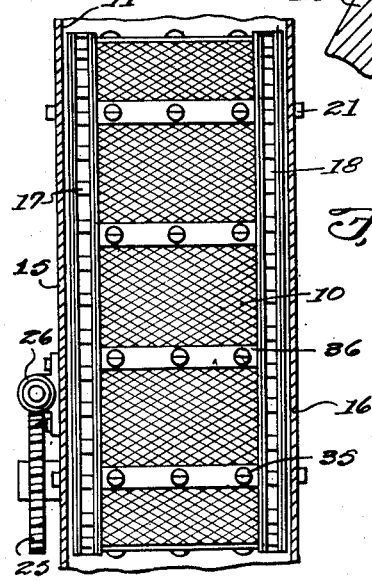
Fig. 3.
Fig. 5.
INVENTOR.
George M. Benner,
BY Victor J. Evans & Co.
ATTORNEYS Dec. 28, 1954  G. M. BENNER  2,698,091
CENTRIJUICER
Filed Oct. 5, 1950  3 Sheets-Sheet 3
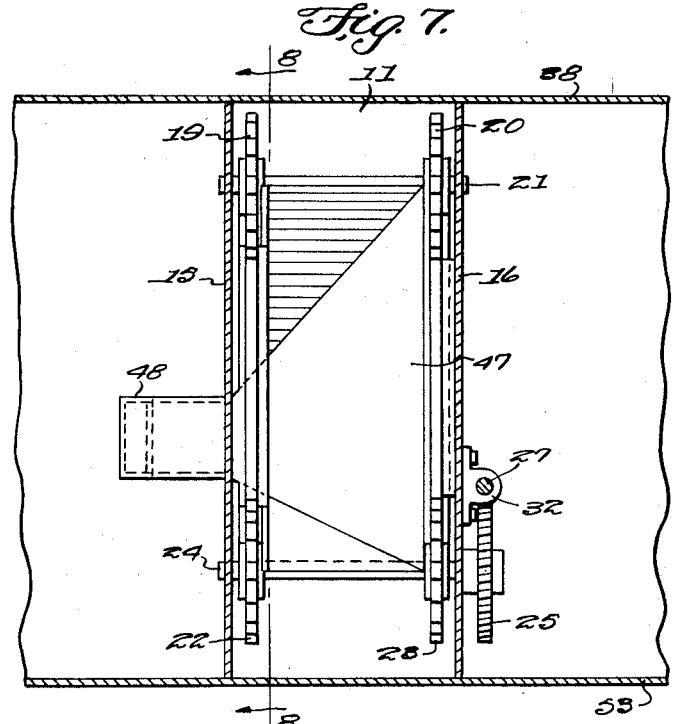
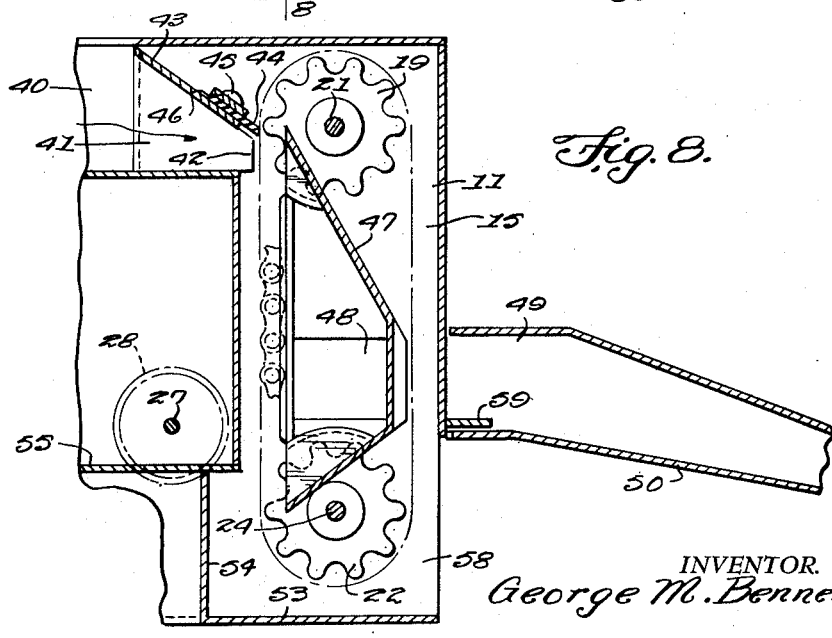
INVENTOR.
George M. Benner,
BY Victor J. Evans & Co.
ATTORNEYS

United States Patent Office 2,698,091
Patented Dec. 28, 1954

2,698,091

CENTRIJUICER

George M. Benner, Seattle, Wash.

Application October 5, 1950, Serial No. 188,609

1 Claim. (Cl. 210—68)

This invention relates to devices for extracting juice from the pulp of fruits such as grapes, berries, apples, pears and the like, and in particular a rotatable strainer having endless wire mesh screening elements with means feeding materials to inner faces of the screening elements, means positioned between sections of the screening elements for receiving juice separated from the pulp, means receiving the pomace from the outer surfaces of the outer sections of the screening elements, and means mounting and rotating the screening elements to obtain centrifugal force for separating first the juice from the pulp and then the pulp or pomace from the screening elements.

The purpose of this invention is to provide a juice extractor in which products are fed continuously through the juice extracting elements.

In the conventional type of fruit juice extractor, the products are crushed and the juice is removed by squeezing or compressing the parts, or as in some devices, by mashing the products or pulp thereof through screens and the like. In devices of this type it is necessary to intermittently supply and remove materials and in most cases it is necessary to clean the screens. With this thought in mind this invention contemplates a device for extracting juices from pulp, and the like by centrifugal force in which the pulp is fed continuously downwardly on traveling screens whereby the centrifugal force draws the juice from the pulp through the screens into chutes positioned to receive the juice, and the pomace carried downwardly by the screens is similarly removed by centrifugal force as the screens pass upwardly in the return movements thereof.

The object of this invention is, therefore, to provide means for feeding and holding crushed products to and against traveling screens with the screens carried by a rotating member whereby centrifugal force is provided for separating the juice from the product.

Another object of the invention is to provide a device for separating juices from products by centrifugal force in which centrifugal force is also used for separating the pomace from the screens.

With these and other objects and advantages in view the invention embodies a housing rotatably mounted on a spindle with vertically positioned endless screens mounted in the housing and positioned to receive products from a centrally disposed hopper whereby crushed products are positioned against inner surfaces of the screens by centrifugal force so that juice may be removed therefrom and the resulting pomace is removed from the screens in the return movement thereof by centrifugal force.

Other features and advantages of the invention will appear from the following description taken in connection with the drawings wherein:

Figure 2 is a vertical section of the extractor taken on line 2—2 of Figure 1 and with the lower part of the mounting elements broken away.

Figure 3 is a vertical section taken on line 3—3 of Figure 1 illustrating one of the screen elements.

Figure 4 is a detail on an enlarged scale illustrating the attachment of one of the screen mounting bars to one of the chains.

Figure 5 is a sectional plan through the extension shown in Figure 4 showing a screen secured to the cross bar extended from the chain.

Figure 7 is a sectional plan taken on line 7—7 of Figure 1 also showing one of the screens as shown in Figure 3, and illustrating the mounting thereof in the housing.

Figure 8 is a vertical section taken on line 8—8 of Figure 7 illustrating the position of the juice receiving chute positioned between the screens of the screening elements also showing pulp or pomace carrying chutes extended from the housing.

Figure 1:
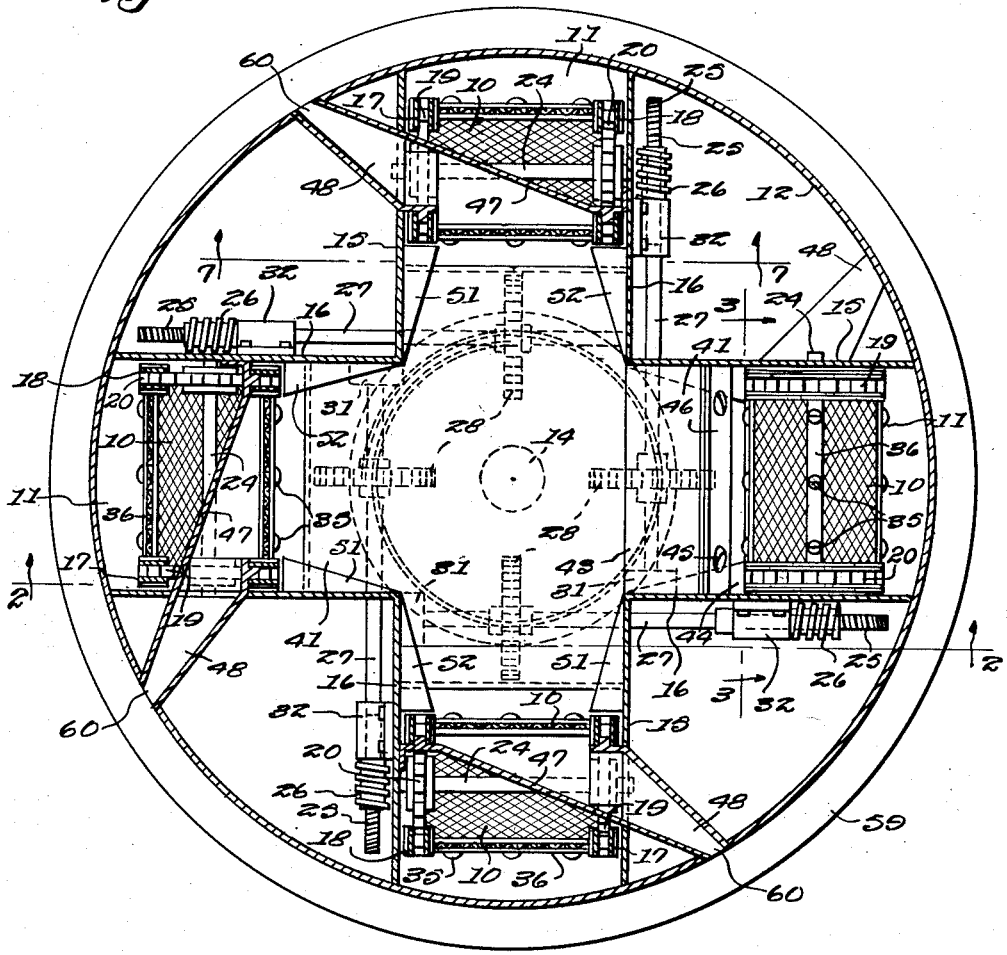
Figure 1 is a sectional plan through the upper part of the juice extractor taken on line 1—1 of Figure 2.

Referring now to the drawings wherein like reference characters denote corresponding parts the centrifugal fruit juice extractor of this invention includes a plurality of endless screens 10 positioned in sections 11 of a cylindrical housing having an outer wall 12 and rotatably mounted on a stand 13 through a spindle 14.

Each of the sections 11 of the housing is provided with spaced parallel vertically disposed side plates 15 and 16 and each of the screens 10 is suspended between endless chains 17 and 18 traveling over sprockets 19 and 20 at the upper ends, on the shafts 21, and 22 and 23, at the lower ends on the shafts 24.

Figure 6:
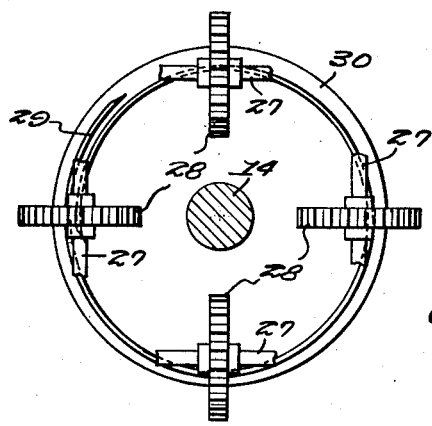
Figure 6 is a sectional plan showing a detail illustrating the gears for actuating the screens.

Each shaft 24, which extends through the lower end of a screening element is provided with a worm gear 25 that mashes with a worm 26 on a stub shaft 27 that is rotated by a gear 28 which meshes with screw threads 29 on the upper surface of a plate 30 that is fixedly mounted on the upper end of the stand 13. With the shaft 27 journaled in bearings 31 and 32 in the housing, and with the housing rotated by the spindle 14 the gears 28 are rotated by the threads 29, as shown in Figure 6. The shaft 27 rotates the worms 26 which turns the worm gears 25 and the lower shafts 24 of the screen elements whereby the endless screens are actuated through the chains 17 and 18 on sprockets on which the chains are positioned.

As illustrated in Figures 4 and 5 the links of the chains are connected to side plates or flanges 33 on the ends of cross bars 34 and the screens 10 are secured to the cross bars by screws 35 which extend through strips 36 and are threaded into openings 37 in the bars 34.

The housing 12 is provided with a cover plate 38 having a centrally disposed feeding opening 39 through which products are fed through an inner hopper 40 which, as illustrated on the left hand side of Figure 2 communicates with radially disposed chutes 41 having throats 42 in the outer ends and the products pass from the hopper 40 through the chutes and throat to the surfaces of the screens 10. The chutes 41 are provided with sloping upper walls 43 and strips 44 of resilient material are fastened to the lower edges of the sloping walls by screws 45 and 46. By this means the area of the throat may be adjusted as desired.

From the throat 42 the pulp or other products pass to the surfaces of the screens 10 and, as illustrated in Figure 8 the centrifugal force resulting from rotation of the housing 12 draws the juices from the pulp with the juices passing through the screens and into chutes 47 and the converging walls of the chutes guides the juices to outlet spouts 48. The outlet spouts feed the juices to a continuous chamber 49 surrounding the housing and the chamber 49 is provided with spouts 50 by which the juices may be supplied to containers and the like.

The inner surfaces of the side walls 15 and 16 of the sections 11 of the housing are provided with sloping baffles 51 and 52 which guide the pulp or other products to the screens and provide shields to protect the chains.

The lower ends of the sections 11 are provided with plates 53 and upwardly extended plates 54 at the inner ends of the sections provide closure elements closing the inner parts of the sections, the upper edges of the plates 54 being connected to a plate 55 in the center of the housing. The plate 55 is provided with openings 56 for the gears 28, as shown in Figure 2.

The pulp or other products on the downwardly traveling screens 10 is held to the surfaces of the screens after the juices are forced therefrom by the centrifugal force and this pomace travels around the lower ends of the screening units. As this pomace starts upwardly, on the return sections of the screens it is forced away from the screens by centrifugal force by which it is deposited in chutes 57 extended from the housing. The lower ends of the sections 11 of the housing are provided with openings 58 that communicate with the continuous inner section of the chute 57.

The housing 12 is provided with a continuous annular flange 59 which is positioned over the chute 57, as illustrated in Figure 2 and which extends through the chute 49, as illustrated in Figure 8. The peripheral wall 12 of the housing is provided with outlet openings 60 that communicate with the interior of the spouts 48 extended from the chute 47.

With the parts arranged in this manner fresh fruits such as pulp of apples, pears, berries and particularly grapes are supplied through the opening 39 and with the housing rotating at comparatively high speed the pulp is fed through the chutes 41 and the throats 42 therein against the screens 10, as indicated by the arrows in Figure 2. The inner sections of the screens travel downwardly carrying the pulp over the openings or faces of the chutes 47 and the centrifugal force draws the juices through the screens, into the chutes 47 and through the spouts 48 to the annular chamber 49 from which it passes through the chute 50. The pulp is then drawn from the opposite sides of the screens passing outwardly through the openings 58 and into chutes 57.

It will be understood that although the outlet screen elements are illustrated as traveling vertically the screens may also be used in any position and pulp may be fed through the screens by other means. It will also be understood that the screens may be independently operated and driven by any suitable motive power.

It will be understood that other modifications may be made in the design and arrangement of the parts without departing from the spirit of the invention.

What is claimed is:

A juice extractor comprising a cylindrical housing having an outer wall, a stand provided with a spindle rotatably supporting said housing, said housing including a plurality of sections each embodying a pair of spaced parallel vertically disposed side plates, an upper and lower shaft journaled between each pair of plates, sprockets mounted on said shafts, endless chains trained over said sprockets and having their inner runs traveling downwardly, endless screens secured to said chains, a worm gear mounted on each of said lower shafts, a worm meshing with said worm gear, a stub shaft connected to said worm, a gear mounted on said stub shaft, a plate secured to said stand and having screw threads on its upper surface meshing with said gear, a cover plate mounted on said housing and provided with a central feeding opening, a hopper arranged within said housing for receiving material from said feeding opening, a plurality of radially disposed chutes communicating with said hopper and having throats in their outer ends arranged contiguous to said screens, each of said chutes including a sloping upper wall, a strip of resilient material adjustably secured to the lower edges of said sloping walls, a chute positioned within each of said endless screens, outlet spouts for receiving juices from said last named chutes, a continuous chamber surrounding said housing for receiving juices from said outlet spouts, spouts communicating with said continuous chamber for the egress therethrough of juices from said chamber, sloping baffles positioned on the inner surfaces of said side plates, and chutes extending from said housing for receiving pomace from the bottom of said screens.

References Cited in the file of this patent

UNITED STATES PATENTS

| Number | Name | Date |
|---|---|---|
| 96,304 | Brinjes | Nov. 2, 1869 |
| 1,411,582 | Parker et al. | Apr. 4, 1922 |
| 1,988,794 | Hill | Jan. 22, 1935 |
| 2,037,840 | Weston | Apr. 21, 1936 |

FOREIGN PATENTS

| Number | Country | Date |
|---|---|---|
| 616,615 | France | Feb. 5, 1927 |